Jan. 18, 1949.  J. H. CASTEL  2,459,499
CASING JOINT LOCATOR
Filed Dec. 17, 1943  3 Sheets-Sheet 1
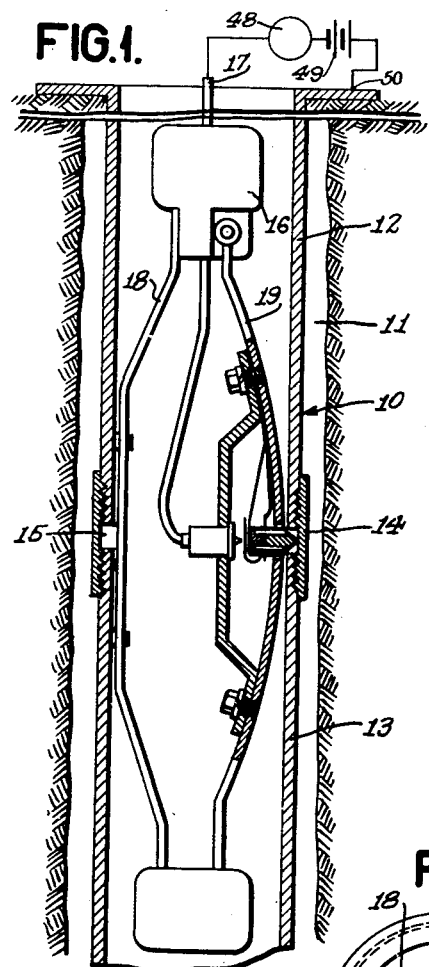
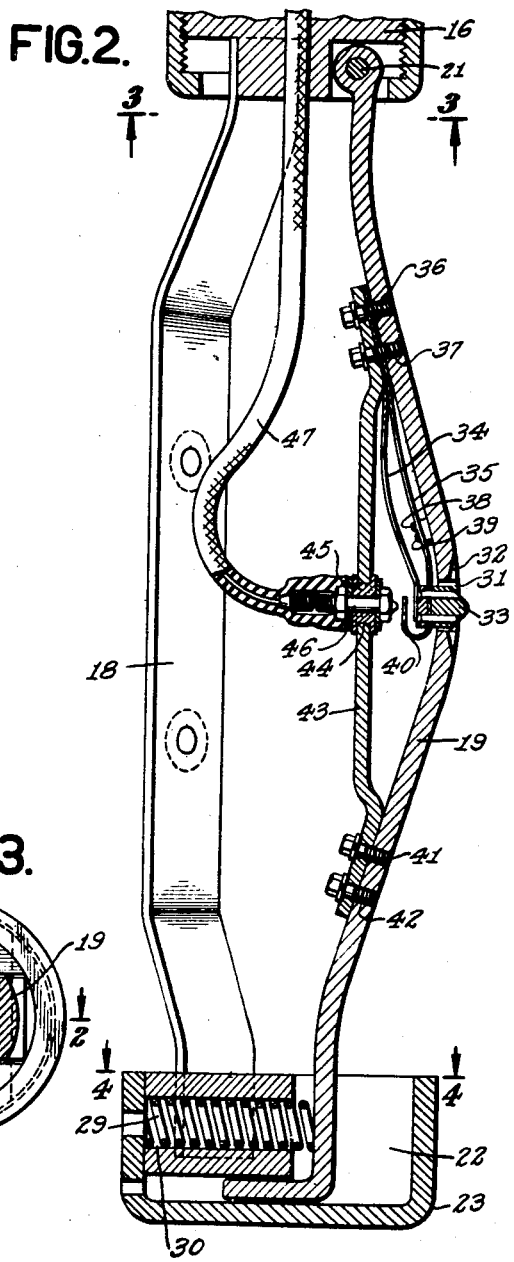
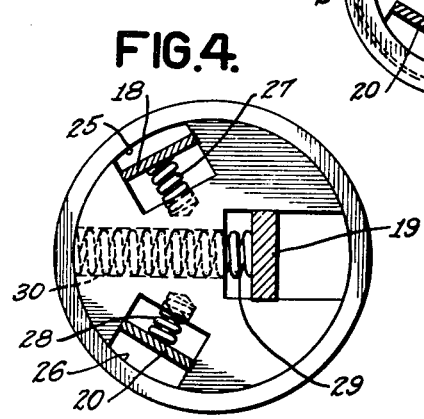
INVENTOR
JACQUES H. CASTEL
BY Hoguet, Neary & Campbell
ATTORNEYS

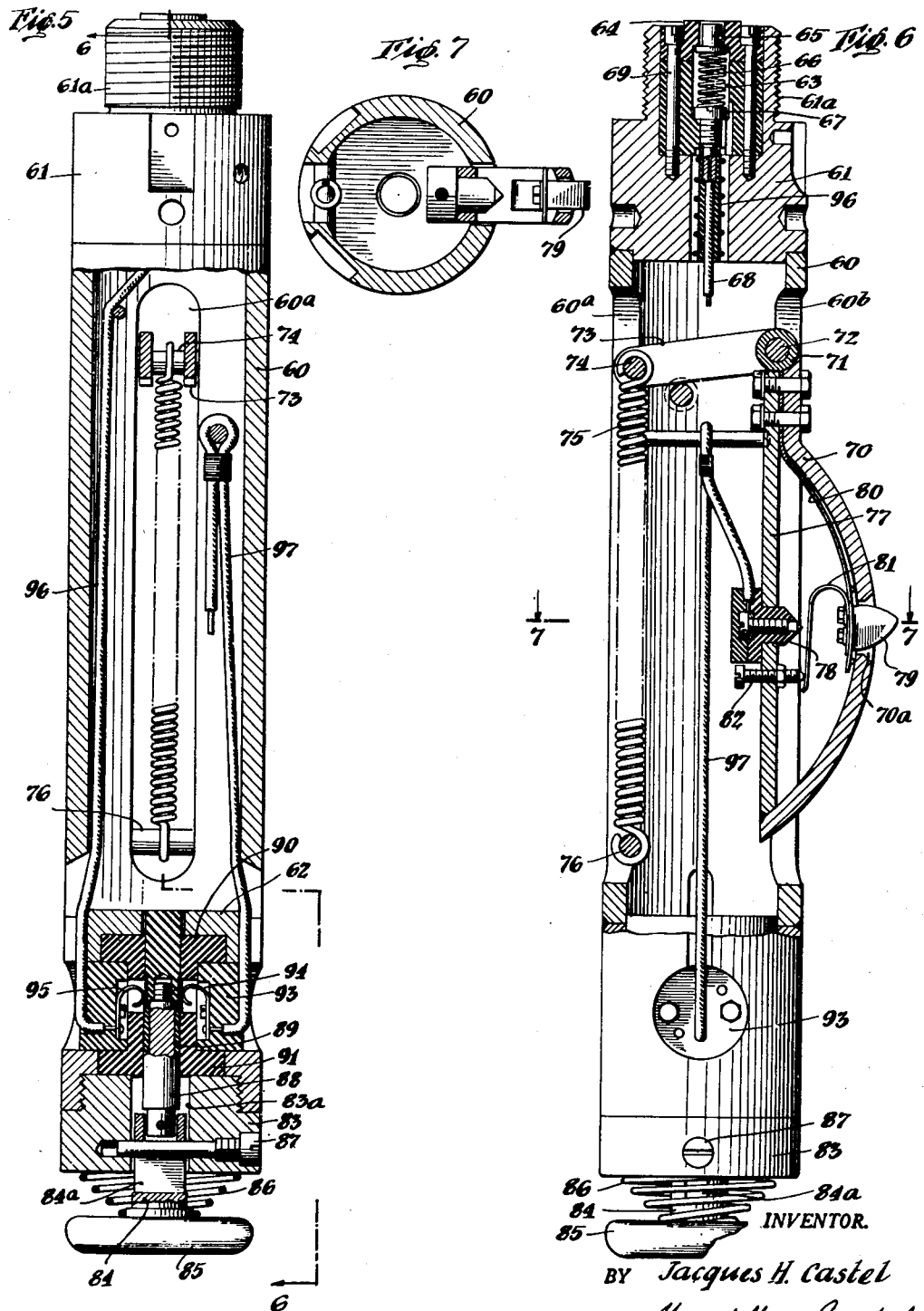

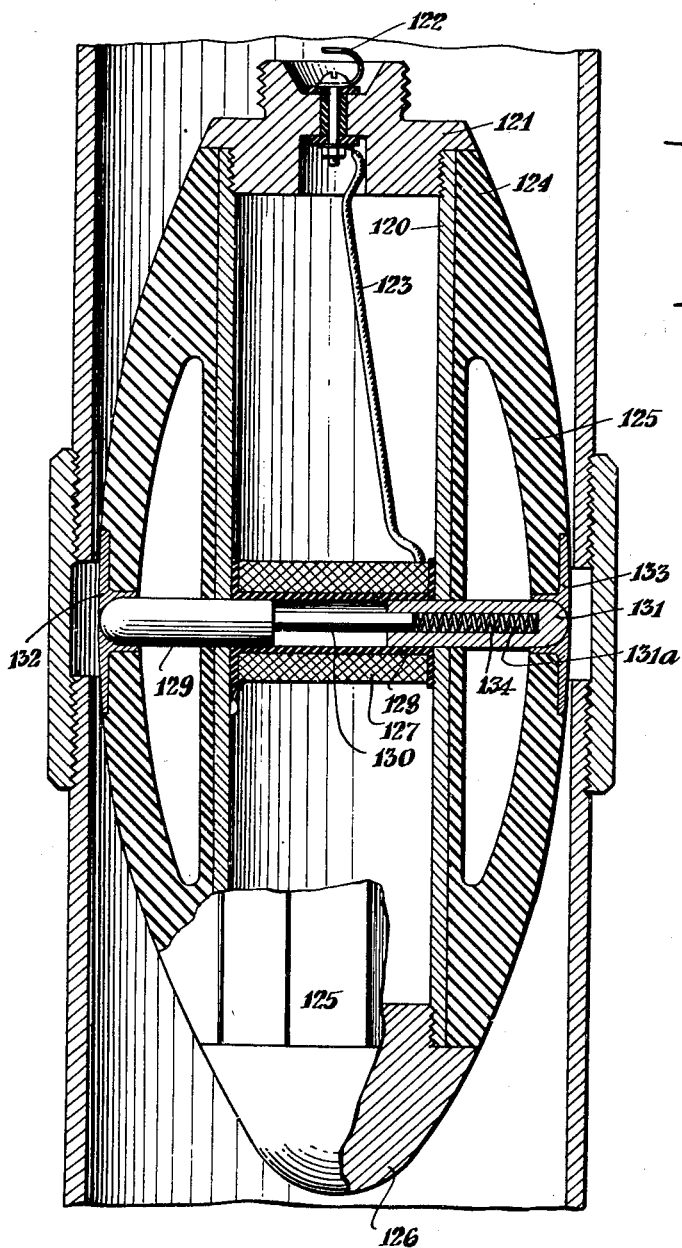
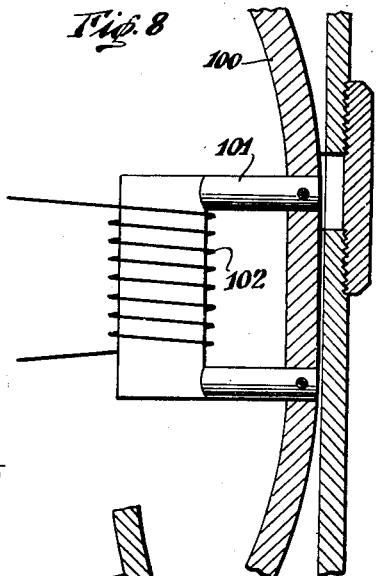
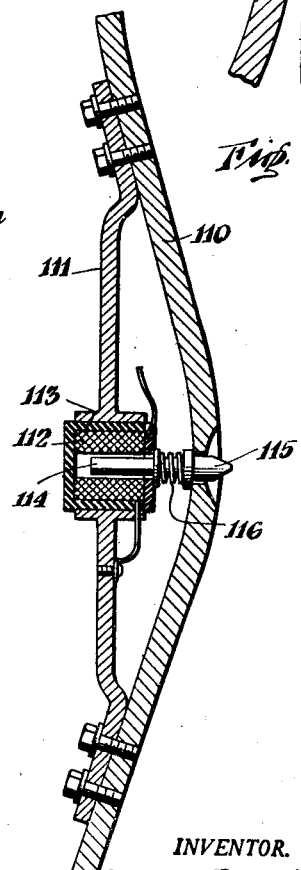

Patented Jan. 18, 1949

2,459,499

UNITED STATES PATENT OFFICE 2,459,499

CASING JOINT LOCATOR

Jacques H. Castel, Houston, Tex., assignor to Schlumberger Well Surveying Corporation, Houston, Tex., a corporation of Delaware Application December 17, 1943, Serial No. 514,647

8 Claims. (Cl. 177—311)

The present invention relates to apparatus for use in bore holes drilled into the earth, and more particularly to new and improved apparatus for locating the joints between adjoining sections of the tubing or casing which usually lines a bore hole.

After the depth and thickness of oil bearing formations traversed by a drill hole have been determined, and the casing has been set, an oil well is generally brought into production by perforating the casing at the level of one of the oil bearing formations. In some instances, it is necessary to perforate the casing opposite very thin sands. In others, the water table may divide a sand into an upper productive portion and a lower water bearing portion, in which case the casing must be perforated only at the level of the productive portion. For these reasons it is very important that the perforating apparatus be accurately positioned at the level of the formation to be produced.

The casing is generally perforated by means of a gun perforator of the type disclosed in prior Patent No. 2,141,827, for example, which is lowered into the bore hole on a cable. A gun perforator of this character is usually positioned in the bore hole by measuring the displacement of the supporting cable. Well operators, on the other hand, generally measure each section of casing before it goes into the well and compute the depths of the respective casing joints in the completed casing. In order to insure a high degree of accuracy in perforating operations, it is desirable to check the position of the perforator as determined from cable measurements with its position relative to a casing joint the depth of which is accurately known.

Also it is frequently desirable to ascertain the exact position of casing joints in situ preparatory to salvaging casing as it is possible to shoot or otherwise split a casing coupling above the point at which the casing is cemented and then easily remove the upper portion of the casing.

It is an object of the invention, accordingly, to provide new and improved apparatus for accurately locating the joints between respective sections comprising a bore hole casing after the latter has been set in the hole.

Another object of the invention is to provide a new and improved casing joint locating apparatus of the above character which may be lowered into a bore hole on a cable, whereby cable measurements may be checked against the computed depths of the casing joints obtained from casing section measurements made prior to the insertion of the casing in the bore hole.

A further object of the invention is to provide a new and improved casing joint locator of the above character which is adapted to be used in bore hole casings of different diameter.

Still another object of the invention is to provide a new and improved casing joint locator of the above character which responds to small increments in casing diameter rather than to an excess in diameter over a predetermined maximum value.

Another object of the invention is to provide equipment by which the position of casing joints may be accurately ascertained with respect to the bottom of the hole or a plug therein.

In accordance with the invention, the casing joint locator comprises an assembly including a plurality of angularly spaced apart members that are continually urged into engagement with the casing. Associated with one of these members are means that can detect an increased diameter of small extent axially of the casing such as that produced by a gap between the ends of the casing sections. More particularly, one type of detecting means can take the form of a contactor that engages and follows the wall of the casing and is associated with a switch that is actuated to open or closed positions depending upon whether the apparatus is located at a casing joint. The switching means is included in a circuit provided with means for indicating the position of the switching means. In order that the device may function in casings of different diameter, it is designed to respond only to small variations in diameter rather than to an increase in diameter over a predetermined maximum value, as described in greater detail below.

In other forms of the invention, the detecting means may include a magnetic circuit, the inductance of which may be varied as the apparatus passes a casing joint, thereby to provide a current fluctuation indicating the presence of a casing joint.

If desired, the apparatus may be provided with means for detecting the engagement of the apparatus with the bottom of a bore hole, so that measurements can be obtained with reference to the bottom of the bore hole.

The invention may be better understood from the following detailed description taken in conjunction with the accompanying drawings, in which:

Figure 1 is a view in vertical section illustrating apparatus constructed according to the invention for locating the joints in a string of casing;

Figure 2 is an enlarged view in longitudinal section of the apparatus shown in Figure 1;

Figure 3 is a cross-sectional view taken along the line 3—3 of Figure 2 and looking in the direction of the arrows;

Figure 4 is a view in cross-section taken along the line 4—4 of Figure 2 and looking in the direction of the arrows;

Figure 5 is a view partly in longitudinal section of a modified form of a casing joint locator which can be used to determine when the device is resting on the bottom of a well;

Figure 6 is a view partly in longitudinal section taken on line 6—6 of Figure 5;

Figure 7 is a view in cross-section taken along line 7—7 of Figure 6;

Figure 8 is a view in longitudinal section through a portion of another form of the invention in which the casing joints are located by their effect on a magnetic circuit;

Figure 9 is a view in partial longitudinal section through a portion of another modification wherein the casing joints are indicated by a combination of mechanical and magnetic means; and Figure 10 is a view partly in longitudinal section through a further modification of a casing joint locator of the magnetic type.

In Figure 1 of the drawings is shown a casing joint locator constructed according to the invention and located in position in a casing 10 inserted in a bore hole 11 drilled into the earth. The casing 10 comprises a plurality of sections 12 and 13, for example, which are connected together by means of a conventional type coupling 14. In practice, the threads on the casing sections 12 and 13 and the coupling 14 tend to "make up" before the ends of the casing sections 12 and 13 come into contact so that a narrow annular gap 15 exists in the vicinity of the coupling 14.

The casing joint locating apparatus comprises a head member 16 suspended in the casing 10 on a conventional type electric cable 17, by means of which it may be raised or lowered from the surface of the earth. Secured to the head member 16 are a plurality of angularly spaced apart guide members 18, 19 and 20 (Figure 4) which are preferably made sufficiently rigid to prevent their shape from changing materially as the casing diameter varies. The upper extremities of the guide members 18 and 20 are rigidly secured within the head member 16, as shown in Figure 2, but the guide member 19 is mounted on a pivot 21.

The lower extremity of the guide member 19 is formed in the shape of an L, as shown in Figure 2, and is adapted to be received within a corresponding L-shaped recess 22 formed in a cup-shaped member 23. The lower extremities of the guide members 18 and 20 are mounted in radially extending grooves 25 and 26, as shown in Figure 4. The lower extremity of the guide member 19 is urged outwardly by means of a coil spring 29, which is disposed within a recess 30 formed in the cup-shaped member 23. By this construction, the guide members 18, 19 and 20 are continuously maintained in engagement with the casing 10, as indicated in Figure 1.

As shown in Figure 2, the guide member 19 is provided with a small aperture 31 intermediate its ends which communicates with a dished-out portion 32 formed in the outer face of the guide member 19. Through the aperture 31 extends a small contact member 33 which is urged radially into engagement with the casing 10 by means of conventional type leaf springs 34 and 35 that are secured to the guide member 19 in any suitable manner, as, for example, by the screws 36 and 37. The leaf spring 35 is also secured to the guide member 19 and is provided with stops 38 and 39 which limit the travel of the contact member 33. The leaf spring 35 also serves to center the contact member 33 in the aperture 31. The lower portion of the leaf spring 35 is bent back on itself to form an electrical contact element 40, as shown in the figure.

Secured to the guide member 19 by means of the screws 36, 37, 41 and 42 is a longitudinally extending member 43 having an aperture 44 formed therein directly behind the contact member 33. Within the aperture 44 is disposed a conventional grommet 45 made of suitable electrical insulating material such as Bakelite, for example, within which is mounted an electrical contact 46. The contact member 46 is connected to an insulated conductor 47 in the supporting cable 17, the upper end of which is connected in series with a conventional type current indicating instrument 48 and a source of electrical energy 49, the other terminal of which is grounded to the casing at the point 50. The portions of the electrical contact 46 that are exposed are covered with insulating material, Glyptal paint, or a Bakelite cap, for example, except for the very end which contacts the member 40. Thus when the switch is open (as at a casing joint) only a very small area of the energized side of the electric circuit is exposed to the fluid that may be in the bore hole, thus reducing the leakage current, thereby providing sharp, easily discerned indications of the position of the casing joints.

When the apparatus is lowered into the casing 10, the contact member 33 is moved inwardly, causing the contact element 40 to engage the contact 46 and closing the circuit including the indicating instrument 48 at the surface of the earth. However, as soon as the contact member 33 reaches the level of the gap 15 in the casing 10, it is urged outwardly by the leaf springs 34 and 35, disengaging the contact element 40 from the contact 46 and breaking the circuit including the indicating instrument 48. Hence the apparatus provides a clear indication at the surface of the earth that the gap 15 formed by the casing joint has been reached.

In view of the fact that the arm 43 is maintained in fixed relationship to the guide member 19, it will be readily apparent that the switch comprising the contact element 40 and the contact 46 will function properly in bore holes of different diameters. As a practical matter, the spacing between the contact element 40 and the contact 46 should be chosen so that the switch will not respond to slight variations in the diameter of the casing sections, but will respond as soon as the contact member 33 moves outwardly into the gap 15 comprising the casing joint. The device can be used in casings of much larger diameter than those for which it was built by providing spacers or long blocks on guides 18 and 20.

It will be apparent also that the guide members 18, 19 and 20 will readily accommodate a wide range of bore hole diameters and that the apparatus will function efficiently in bore holes of different diameter. The apparatus, accordingly, enables both the joints in the casing and in tubing of smaller diameter that may be inserted below the casing to be located during the course of a single run.

The modified form of casing joint locator illustrated in Figures 5–7 includes a mechanism for determining when the device is resting on the bottom of a bore hole or on a plug. A mechanism of this type is shown in application Serial No. 470,447, now Patent No. 2,361,064, filed by Marcel Schlumberger. This form of casing joint locating mechanism includes a tubular body member 60 having plugs 61 and 62 in opposite ends thereof and longitudinally extending slots 60a and 60b. The upper plug 61 is provided with a hollow threaded portion 61a in which is received an insulating sleeve 63 and an annular insulating member 64 having aligned openings which receive a contact plug 65 and a spring 66. The spring 66 bears against the contact 65 and also against a set screw 67 threaded into the sleeve 63 and having an insulated conductor 68 connected thereto. The sleeves 63 and 64 are retained in a recess in the plug 61 by means of set screws 69. This arrangement permits the tubular support 61 to be suspended from a cable having a central conductor which makes contact with the contact plug 65.

The tubular member 60 may be provided with a pair of angularly spaced guide elements (not shown) for guiding the member 60 in the casing.

The third guide member includes a bowed member 70 having a bushing 71 at its upper end for receiving a pivot pin 72 extending across the top of the slot 60b in the member 60. The bushing 71 has a pair of levers 73 projecting inwardly therefrom and connected by a cross pin 74. The bow member 70 is rocked outwardly by means of a tension spring 75 engaging the cross pin 74 and a pin 76 adjacent the lower end of the slot 60a.

The bow member 70 is rigidified by means of a strap 77 secured between the opposite ends thereof and which carries near its midportion a contact assembly 78 similar to the contact assembly 45, 46, shown in Figures 1–4, inclusive.

The bow member 70 is provided with a centrally disposed aperture 70a through which projects a contact member 79 that is carried by a leaf spring 80 secured adjacent the upper end of the bow member 70. The contact member 79 is also provided with a U-shaped contact spring 81 which overlies the contact assembly 78 and has a free end bearing against an adjustable set screw 82 in the strap 77. The set screw 82 permits adjustment of the contact spring 81, thereby regulating the amount of displacement of the contact member 79 necessary to permit the contact spring 81 to disengage from the contact assembly 78.

In determining the location of the casing joints, the above-described construction operates in a manner similar to the devices disclosed in Figures 1–4 in that the contact member 79 is normally pressed inwardly by engagement with the casing and a circuit including an indicating instrument, not shown, is closed. When the contact member 79 engages in a casing joint, the contact spring 81 is disengaged from the contact assembly 78, thereby opening the circuit to the indicator and deenergizing the indicator at the surface.

The casing joint locator is provided with a switch mechanism similar to that shown in application Serial No. 470,447 that is actuated upon engagement of the device with the bottom of the bore hole.

As shown in Figure 5, the plug 62 contains an annular member 83 provided with an axial opening 83a which receives slidably a stud 84 on a contact button 85. The stud and contact button 85 are normally urged downwardly by means of a spring 86 interposed between the button 85 and the end of the member 83. The stud 84 is retained in the member 83 by means of a cross pin 87 extending through an elongated slot 84a in the stud 84.

The upper end of the stud 84 is provided with a bore in which is pinned a cylindrical contact element 88 having an annular sleeve 89 thereon of conducting material. The member 88 is slidably received in a pair of insulating bushings 90 and 91 received in a recess in the plug 62 and spaced apart by an insulating collar 93. The insulating collar 93 is provided with a pair of diametrically spaced contact springs 94 and 95 which normally engage the cylindrical member 88 and engage the conducting sleeve 89 when the button 85 is in its lowermost position.

When the button 85 is lifted, as by engagement with a plug in the bore hole or the bottom of the bore hole, the conducting sleeve 89 is moved upwardly out of engagement with the spring contacts 94 and 95.

As shown in Figures 5 and 6, the contact 95 is connected by an insulated conductor 96 to the set screw 67, while the contact 94 is connected by means of the conductor 97 to the contact member 78. The switch formed by the conducting sleeve 89 and the contacts 94 and 95 thus is connected in series with the contact 78, the switch contact 81 and ground.

In operation, when the device described above is resting on the bottom of the bore hole, the switch 89, 94 and 95 is open and the indicator at the surface of the earth is not energized.

When the device is drawn upwardly so that the button 85 loses contact with the bottom of the bore hole, the switch 89, 94 and 95 is closed, thereby actuating the indicator at the surface of the earth. When the device is raised sufficiently to bring the contact member 79 into alignment with a casing joint, the circuit is again opened and the indicator is deenergized. With the distance between the button 85 and the contact member 79 known, a very accurate indication of the distance between the bottom of the bore hole and the casing joint can be obtained.

Instead of including a switch that is actuated as the device passes the casing joint, the gap between the ends of the two adjacent sections of casing can be utilized to affect a magnetic circuit directly or indirectly so that an indication can be obtained as the locator passes a casing joint. Typical casing joint locators embodying this form of the invention are disclosed in Figures 8, 9 and 10.

The form of casing joint locator disclosed in Figure 8 of the drawing includes a guide member 100 of arcuate form, made of non-magnetic material, that can be substituted for the member 19 of Figure 1 or the member 70 of Figures 5–7. The guide member 100 is adapted to engage the casing in the manner described heretofore. Mounted on the guide member is a generally U-shaped core member 101 formed of magnetic material. A coil 102 is wound on the base of the U-shaped member and is connected through a current sensitive instrument, not shown, to a source of alternating current, not shown, at the surface of the earth. The legs of the core project through the bow member 100 and come in contact with the casing or nearly so.

One side of the coil or winding 102 can be grounded so that only one wire need be led to the surface of the earth.

In operation, the winding or coil 102 is continuously energized from the alternating current source, thereby producing a magnetic flux, the major portion of which flows through the core 101 and the casing. The flux, therefore, flows along a closed path of high permeability. As the device is moved along the bore hole, one of the legs of the core 101 will come adjacent the gap between two casing sections, thereby creating a gap in the magnetic circuit. This gap reduces the inductance in the winding and causes an increase in the current flowing from the source through the winding, thereby providing an indication on the indicating instrument at the surface of the earth.

As soon as one leg of the core passes the gap in the casing, the current will again decrease to approximately its former value as the magnetic circuit is closed through the coupling. When the other leg is adjacent the gap in the casing, the current is again increased and another indication is obtained. Thus, a double indication of the presence of a casing joint is obtained by the device described above.

The type of device disclosed in Figure 9 includes a guide bow member 110 that may be substituted for the member 19 of Figures 1-4 or the member 70 of Figures 5-7. The bow 110 is provided with a cross member 111 that carries a solenoid winding 112 mounted in a casing 113 of magnetic material. The solenoid 112 receives a movable core 114 of magnetic material engaging the outer end of the casing 113 which is provided with a contact member 115 normally urged into engagement with the bore hole casing by means of the spring 116. The length of the core 114 is such that when the tip of the contact 115 is substantially flush with the surface of the bow 110, the inner end of the core 114 is substantially in engagement with the inner end of the casing 113.

In operation, the solenoid, which has one end connected to an indicating instrument and a source of alternating current, and the opposite end grounded, is continuously energized by the alternating current to form a flux path through the casing 113 and the core 114. The magnetic circuit is closed through a path of high permeability providing maximum inductance in the electric circuit when the core 114 is in its innermost position. When a casing joint is encountered, the contact member 115 moves outwardly, thereby moving the core 62 to the right and creating a gap in the magnetic circuit. This gap reduces the inductance of the solenoid 112 and produces an increase in the current flowing in the circuit.

A similar type of device can be provided in which no exterior source of current is required. Thus, the core 114 can be magnetized and through its movement when passing over the casing joint generates a current in the solenoid 112 which can be used to actuate an indicator at the surface of the earth.

The embodiment disclosed in Figure 10 of the drawing utilizes a magnetic circuit that is completed through the steel casing for providing an indication of the location of a casing joint. This form of device includes a tube 120 formed of non-magnetic material and having a suitable plug 121 at its upper end for coupling the tube to a cable. The plug is provided with suitable connections 122 for an electric conductor 123.

A tubular guide member 124 formed of "neoprene" or other synthetic or natural rubber material is received on the tube 120. The guide member 124 is provided with a plurality of longitudinal bows or arcuate ribs 125 which act to guide the member in the casing. The sleeve 124 is retained on the tube 120 by means of a suitable bullet nose plug 126 threaded in the lower end of the tubular member 120. Substantially midway of the length of the tubular member 120 is a winding or solenoid 127 which is supported on a hollow tubular core 128 of non-magnetic material. One end of the winding 127 is connected to a suitable alternating current source and to an indicator by means of the conductor 123, while the other end of the winding may be grounded on the tubular member 120. Within the tubular member 128 is a rod-like plunger element 129 formed of magnetic material having a stem 130 that is received in a recess 131a of another rod-like plunger member 131. A spring 132 is interposed between the end of the stem 130 and the bottom of the recess 131a, thereby normally urging the members 129 and 131 apart. The ends of the members 129 and 131 are received in rigid members 132 and 133 formed of non-magnetic material that are embedded in and secured to the bows 125.

The members 132 and 133 are normally urged outwardly by the resiliency of the bows 125 and the spring 134 so that the ends of the members 129 and 131 are adjacent to or are in contact with the casing.

In operation, the winding 127 is continuously energized from the alternating current source as the device is moved through the casing. So long as the assembly is in a casing section, a magnetic circuit is completed through the plunger 131, around the casing in a horizontal plane and through the member 129 and its stem 130. When a casing joint is encountered, a gap is produced between the ends of the members 129 and 131 and the casing which reduces the inductance of the winding 127, thereby causing the current flowing through the electric circuit to increase and providing an indication at the surface of the earth.

The invention thus provides new and improved apparatus for locating the joints between adjoining casing sections in a string of bore hole casing. Inasmuch as the apparatus may be readily lowered into the bore hole on an electric cable, it enables depths determined from cable measurements to be checked against depths determined by computations from measurements of the casing section lengths. By providing for the accurate location of these casing joints, apparatus such as a gun perforator, for example, may be accurately located at the level of a formation to be produced.

Moreover, the apparatus enables the operator to avoid perforating the casing at the level of a joint. This is sometimes desirable since the casing may be weakened or the coupling split by perforation at the casing joint. Also, the resistance to the passage of a perforating projectile is generally greater at a casing joint, since the projectile may have to penetrate both the casing and the coupling.

While specific embodiments of the invention have been described above, the invention is not limited thereto, inasmuch as it will be understood that the embodiments are susceptible to many changes, for example, in the shape and arrangement of the elements and the type of indicating instruments that are used therewith. The above-described embodiments, therefore, should be regarded as illustrative, only, and not as limiting the scope of the following claims.

I claim:

1. A casing joint locator comprising a support adapted to be lowered into a bore hole, guiding means mounted on the support, said guiding means having a portion movable in accordance with variations in the casing diameter but being unresponsive to the gap between adjoining casing sections, switching means having one contact mounted in fixed relation to said guiding means movable portion and a second contact adjacent thereto, an actuator for moving said second contact into engagement with said first contact, and means for urging said actuator into engagement with the casing, said actuator being mounted on said guiding means and movable relatively thereto, said contacts being adapted to remain in engagement while the switch actuator engages the casing, and to become disengaged when the actuator reaches the level of a casing joint.

2. A casing joint locator comprising a support adapted to be lowered into a bore hole, a plurality of angularly spaced apart guides mounted on the support, means pivotally connecting an end of one of said guides to said support, means for urging said one guide into engagement with the casing, said one guide being movable in accordance with variations in the casing diameter but being unresponsive to the gap between adjoining casing sections, switching means mounted on said one guide, said switching means having one contact mounted in fixed relation to said one guide and a second contact movable into and out of engagement with said one contact, an actuator for said second contact mounted on said one guide for movement relatively thereto, and means mounted on said one guide for urging the actuator into engagement with the casing, said first and second contacts being adapted to engage one another when the actuator is in engagement with the casing, and to become disengaged when the actuator reaches the level of a casing joint.

3. A device for determining the distance between the bottom of a well and a joint in a casing therein formed of a plurality of casing sections connected by joints of different internal diameter than the internal diameters of said casing sections, comprising a support adapted to be lowered into said casing, guide means on said support engageable with said casing, an electrically actuated indicator, joint locating means associated with said guide means, electrically connected with said indicator, and responsive to variation in the internal diameter of said casing at said joints for controlling the supply of electrical energy to actuate said indicator, bottom locating means movably mounted at the lower end of said support and movable in response to engagement thereof with the bottom of the bore hole, and a switch actuated by said bottom locating means and electrically connected to said indicator for actuating said indicator.

4. A device for determining the distance between the bottom of a well and a joint in a casing therein formed of a plurality of casing sections connected by joints of different internal diameter than the internal diameters of said casing sections, comprising a support adapted to be lowered into said casing, guide means on said support engageable with said casing, an electrically actuated indicator, joint locating switch means associated with said guide means, electrically connected with said indicator and responsive to variation in the internal diameter of said casing at said joints for actuating said indicator, bottom locating switch means at the lower end of said support, electrically connected with said indicator and movable in response to engagement thereof with the bottom of the bore hole for actuating said indicator.

5. A casing joint locator for use in bore holes having a casing therein formed of a plurality of casing sections joined by couplings that leave narrow annular recesses between the adjacent ends of, and of greater internal diameter than, the casing sections, comprising a support adapted to be lowered into said casing, guiding means mounted on said support and having a movable portion urged radially outwardly for engagement with said casing, said portion of said guiding means being of greater length than the axial length of said recesses, whereby said guiding means portion is movable in accordance with variations in the diameter of the casing but said recesses do not cause substantial movement of said guiding means, a contactor movably mounted on said guiding means having a portion narrower than said recesses, means urging said contactor outwardly relatively to said guiding means to cause said contactor to move relatively to said guiding means and enter said recesses, and electrical means having a part movable with said contactor and a cooperating part fixed to said guiding means movable portion for providing a variation in an electrical value upon movement of said contactor into a recess.

6. A casing point locator for use in bore holes having a casing therein formed of a plurality of casing sections joined by couplings that leave narrow annular recesses between the adjacent ends of, and of greater internal diameter than, the casing sections, comprising a support adapted to be lowered into said casing, guiding means mounted on said support and having a portion urged radially outwardly for engagement with said casing, said portion of said guiding means being of greater length than the axial length of said recesses, whereby said guiding means portion is movable in accordance with variations in the diameter of the casing but said recesses do not cause substantial movement of said guiding means, a contactor movably mounted on said guiding means having a portion narrower than said recesses, means urging said contactor outwardly relatively to said guiding means to cause said contactor to move relatively to said guiding means and enter said recesses, and electrical switching means having a contact movable with said contactor and a cooperating contact fixed to said guiding means for providing a variation in an electrical value upon movement of said contactor into a recess.

7. A casing joint locator for use in bore holes having a casing therein formed of a plurality of casing sections joined by couplings that leave narrow annular recesses between the adjacent ends of, and of greater internal diameter than, the casing sections, comprising a support adapted to be lowered into said casing, guiding means mounted on said support and having a movable portion urged radially outwardly for engagement with said casing, said portion of said guiding means being of greater length than the axial length of said recesses, whereby said guiding means portion is movable in accordance with variations in the diameter of the casing but said recesses do not cause substantial movement of said guiding means, a contactor movably mounted on said guiding means having a portion narrower than said recesses, means urging said contactor outwardly relatively to said guiding means to cause said contactor to move relatively to said guiding means and enter said recesses, and electrical generating means having a magnetic element movable with said contactor and a cooperating coil member fixed to said guiding means movable portion for providing a variation in an electrical value upon movement of said contactor into a recess.

8. A device for determining the distance between the bottom of a well and a joint in a casing therein formed of a plurality of casing sections connected by joints of different internal diameter than the internal diameters of said casing sections, comprising a support adapted to be lowered into said casing, guide means on said support engageable with said casing, an electrically-actuated indicator, casing joint locating means carried by said guide means for providing a variation in an electrical quantity upon locating a casing joint, said locating means being electrically connected to said indicator for actuating said indicator when said locating means locates a casing joint, bottom-locating means movable in response to engagement thereof with the bottom of the bore hole, and electrical means actuated by said bottom-locating means and electrically connected to said indicator for actuating said indicator when said bottom-locating means engages the bottom of the bore hole.

JACQUES H. CASTEL.

REFERENCES CITED

The following references are of record in the file of this patent:

UNITED STATES PATENTS

| Number | Name | Date |
| --- | --- | --- |
| 1,708,354 | Cabot | Apr. 9, 1929 |
| 1,988,785 | Dillon | Jan. 22, 1935 |
| 2,037,938 | Spencer | Apr. 21, 1936 |
| 2,074,753 | McClain | Mar. 23, 1937 |
| 2,201,311 | Halliburton | May 21, 1940 |
| 2,267,110 | Kinley | Dec. 23, 1941 |
| 2,281,960 | Vacquier | May 5, 1942 |
| 2,320,863 | Green | June 1, 1943 |
| 2,322,343 | Brandon | June 22, 1943 |

FOREIGN PATENTS

| Number | Country | Date |
| --- | --- | --- |
| 230,860 | Germany | Feb. 7, 1911 |

---

Certificate of Correction

Patent No. 2,459,499.                                                                                                January 18, 1949.

JACQUES H. CASTEL

It is hereby certified that errors appear in the printed specification of the above numbered patent requiring correction as follows:

Column 9, line 4, claim 1, beginning with the words "said actuator" strike out all to and including the syllable and comma "to," in line 6, and insert the same in line 2, same column, after "contact,"; column 10, line 21, claim 6, for "point" read *joint*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*